(12) United States Patent
Wang et al.

(10) Patent No.: US 12,315,079 B2
(45) Date of Patent: May 27, 2025

(54) METHOD, DEVICE AND COMPUTER PROGRAM PRODUCT FOR RENDERING

(71) Applicant: Dell Products L.P., Round Rock, TX (US)

(72) Inventors: Zijia Wang, Weifang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 264 days.

(21) Appl. No.: 18/111,040

(22) Filed: Feb. 17, 2023

(65) Prior Publication Data
US 2024/0242435 A1    Jul. 18, 2024

(30) Foreign Application Priority Data

Jan. 16, 2023    (CN) .......................... 202310077836.0

(51) Int. Cl.
*G06T 17/10*    (2006.01)

(52) U.S. Cl.
CPC .................................. *G06T 17/10* (2013.01)

(58) Field of Classification Search
CPC ......... G06T 17/10; G06T 17/00; G06T 15/00; H04N 21/23412; H04N 21/44012; H04N 21/8146; H04N 21/816
See application file for complete search history.

(56) References Cited

U.S. PATENT DOCUMENTS

2021/0358577 A1\* 11/2021 Zhang .................... G16H 50/70
2022/0066456 A1\* 3/2022 Ebrahimi Afrouzi ....................... G06F 3/04883

FOREIGN PATENT DOCUMENTS

CN           109495476 A  \*  3/2019  ......... G06F 21/6245

OTHER PUBLICATIONS

Chen et al.: TensoRF: Tensorial Radiance Fields [online], [Retrieved Dec. 27, 2024] Retrieved from the Internet <URL: https://arxiv.org/pdf/2203.09517> (Year: 2022).\*

(Continued)

*Primary Examiner* — King Y Poon
*Assistant Examiner* — Vincent Alexander Providence
(74) *Attorney, Agent, or Firm* — Ryan, Mason & Lewis, LLP

(57) ABSTRACT

Embodiments of the present disclosure relate to a method, a device, and a computer program product for rendering. The method comprises modeling a three-dimensional (3D) scene as a four-dimensional (4D) tensor, wherein a first dimension, a second dimension, and a third dimension in the 4D tensor correspond to an X-Y-Z coordinate axis in the 3D scene, a fourth dimension represents a channel dimension corresponding to an encoded feature, and the encoded feature is obtained by encoding the 3D scene with an encoder corresponding to a decoder. The method further comprises performing interpolation on the 4D tensor to obtain streaming scene information associated with the 3D scene. The method further comprises rendering the 3D scene on the basis of the streaming scene information. According to the method, a unified and flexible architecture can be provided for edge-cloud 3D collaboration, and a 3D scene representation can be processed effectively and efficiently.

20 Claims, 5 Drawing Sheets

(56) References Cited

OTHER PUBLICATIONS

Yu et al.: Anytime 3D Object Reconstruction Using Multi-Modal Variational Autoencoder [online], [Retrieved Dec. 23, 2024] Retrieved from the Internet <URL: https://arxiv.org/pdf/2101.10391> (Year: 2021).*

He et al.: Bayesian Temporal Tensor Factorization-Based Interpolation for Time-Series Remote Sensing Data With Large-Area Missing Observations [online], [Retrieved Dec. 27, 2024] Retrieved from the Internet <URL: https://ieeexplore.ieee.org/document/9672202 > (Year: 2022).*

Bao et al.: BEIT: BERT Pre-Training of Image Transformers [online], [Retrieved Apr. 4, 2025] Retrieved from the Internet <URL: https://arxiv.org/pdf/2106.08254> (Year: 2022).*

H. W. Yu et al., "A Variational Observation Model of 3D Object for Probabilistic Semantic SLAM," arXiv:1809.05225v1, Sep. 14, 2018, 7 pages.

C. Wen et al., "Pixel2Mesh++: Multi-View 3D Mesh Generation via Deformation," International Conference on Computer Vision, Nov. 2019, pp. 1042-1051.

S. Popov et al., "CoReNet: Coherent 3D Scene Reconstruction from a Single RGB Image," arXiv:2004.12989v2, Aug. 5, 2020, 17 pages.

B. Mildenhall et al., "NeRF: Representing Scenes as Neural Radiance Fields for View Synthesis," European Conference on Computer Vision, Aug. 2020, 17 pages.

A. Ramesh et al., "Zero-Shot Text-to-Image Generation," International Conference on Machine Learning, arXiv:2102.12092v2, Feb. 26, 2021, 20 pages.

X. Chen et al., "A Bayesian Tensor Decomposition Approach for Spatiotemporal Traffic Data Imputation," Transportation Research Part C Emerging Technologies, Oct. 27, 2018, 16 pages.

A. X. Chang et al., "ShapeNet: An Information-Rich 3D Model Repository," arXiv:1512.03012v1, Dec. 9, 2015, 11 pages.

* cited by examiner

METHOD, DEVICE AND COMPUTER PROGRAM PRODUCT FOR RENDERING

RELATED APPLICATION

The present application claims priority to Chinese Patent Application No. 202310077836.0, filed Jan. 16, 2023, and entitled "Method, Device and Computer Program Product for Rendering," which is incorporated by reference herein in its entirety.

FIELD

Embodiments of the present disclosure generally relate to the technical field of three-dimensional (3D) scene rendering, in particular to a method, a device, and a computer program product for rendering.

BACKGROUND

For effective edge-cloud collaboration, it is very important that edge devices can share visual perception with a cloud or other edge devices. Supporting real-time sharing of two-dimensional (2D) or 3D perception from edge devices in a remote edge-cloud collaboration environment is a great challenge. For example, it may be that only a part of encoded features are transmitted due to a communication failure. Therefore, a robust method that can reconstruct complete 3D contents/scenes from incomplete information is needed in a remote edge-cloud collaboration environment.

SUMMARY

Embodiments of the present disclosure provide a method, a device, and a computer program product for rendering.

In one aspect of the present disclosure, a method for rendering is provided. The method includes modeling a 3D scene as a four-dimensional (4D) tensor, a first dimension, a second dimension, and a third dimension in the 4D tensor corresponding to an X-Y-Z coordinate axis in the 3D scene, a fourth dimension representing a channel dimension corresponding to an encoded feature, and the encoded feature being obtained by encoding the 3D scene with an encoder corresponding to a decoder. The method further includes performing interpolation on the 4D tensor to obtain streaming scene information associated with the 3D scene. The method further includes rendering the 3D scene on the basis of the streaming scene information.

In another aspect of the present disclosure, an electronic device is provided. The electronic device includes a processing unit and a memory, where the memory is coupled to the processing unit and stores instructions. The instructions, when executed by the processing unit, cause the electronic device to perform the following actions: modeling a 3D scene as a 4D tensor, a first dimension, a second dimension, and a third dimension in the 4D tensor corresponding to an X-Y-Z coordinate axis in the 3D scene, a fourth dimension representing a channel dimension corresponding to an encoded feature, and the encoded feature being obtained by encoding the 3D scene with an encoder corresponding to a decoder; performing interpolation on the 4D tensor to obtain streaming scene information associated with the 3D scene; rendering the 3D scene on the basis of the streaming scene information.

In still another aspect of the present disclosure, a computer program product is provided. The computer program product is tangibly stored on a non-transient computer-readable medium and includes computer-executable instructions, the computer-executable instruction, when executed, causing a computer to perform the method or process according to embodiments of the present disclosure.

This Summary is provided to introduce relevant concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
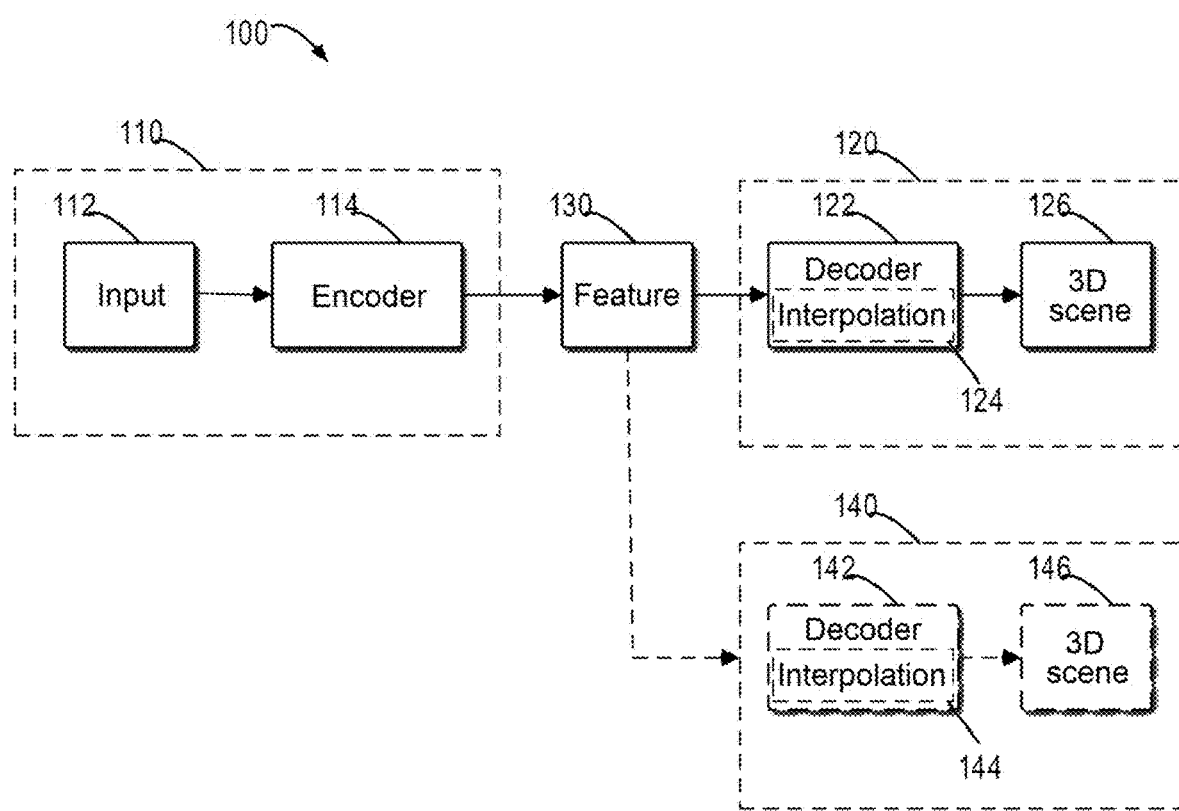
FIG. 1 shows a schematic diagram of an example environment for rendering according to an embodiment of the present disclosure.

Illustrative embodiments of the present disclosure will be described in more detail below with reference to the accompanying drawings. Although some embodiments of the present disclosure are shown in the accompanying drawings, it should be understood that the present disclosure may be implemented in various forms, and should not be viewed as being limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless it is clearly stated that the terms refer to different objects.

In a remote edge-cloud collaboration environment, supporting real-time sharing of 2D or 3D perception from edge devices in a limited communication environment is a great challenge. In edge-cloud collaboration, a network can be considered as an auto-encoder structure by selecting any intermediate layer as the tail end of the encoder part. An encoder represents observed 2D or 3D data as an abstract latent feature space, while a decoder estimates a 3D scene from the latent space.

In recent years, various scene representations (including grids, point clouds, volumes, implicit functions, etc.) have been extensively studied for neural representations for high-quality rendering. More recently, radiance fields have been introduced, illustratively in the form of neural radiance fields (NeRF), to achieve photo-realistic quality. Such representations have been rapidly extended and applied to visual applications. However, while NeRF can achieve realistic rendering, it is limited by its low speed in learning and rendering, and cannot meet the requirements of applications for time delay.

In order to achieve effective edge-cloud collaboration, it is very important that edge devices can share visual perception with a cloud or other edge devices. On the other hand, in harsh remote collaboration environments, for example, it may be that only a part of encoded features are transmitted due to a communication failure. Therefore, a robust method that can reconstruct complete 3D contents/scenes from incomplete information is needed.

In the present disclosure, a new edge-cloud collaboration architecture is provided, which well maintains the spatial information inherent in 3D edge-cloud collaboration scene representations. In some embodiments, the edge-cloud collaboration architecture, illustratively described herein as a tensor auto-encoder (TAE) architecture, uses simple but powerful tensor decomposition to preserve the inherent 3D spatial low-rank information. By exploiting the spatial low-rank prior distribution of the tensor in the latent space, a tensor decoder can estimate missing elements of latent features and present the 3D scene efficiently and effectively. In addition, the edge-cloud collaboration architecture will benefit other downstream tasks, for example, edge-cloud collaboration NeRF can be started for metaverse view synthesis.

Through the edge-cloud collaboration architecture TAE, a spatially perceptual tensor decoder for 3D representations can be implemented. The tensor is a natural way of representing the volume information of the 3D scene. Compact and robust data transmission can also be achieved, as the encoder can be used to compress the observed scene into a low-dimensional latent feature (for example, the latent feature can be a latent vector), while the tensor decoder is used to perform interpolation of missing values. The edge-cloud collaboration architecture TAE is highly flexible and requires only minor modifications to benefit downstream metaverse applications. Thus, the method and device of the present disclosure are suitable for handling many edge-cloud 3D collaboration 3D scene representation problems.

Basic principles and several example embodiments of the present disclosure will be described below with reference to FIGS. 1 to 7. It should be understood that these example embodiments are given only to enable those skilled in the art to better understand and thus implement embodiments of the present disclosure, and are not intended to limit the scope of the present disclosure in any way.

FIG. 1 shows a schematic diagram of example environment 100 for rendering according to an embodiment of the present disclosure. As shown in FIG. 1, edge device 110 and cloud 120 may be included in example environment 100. Edge device 110 may be, for example, arranged close to the user side, and for example, may be arranged locally at a factory. Cloud 120 may be, for example, arranged away from edge device 110. Wireless or wired communication may be performed between edge device 110 and cloud 120.

In some embodiments, in example environment 100, encoder 114 is deployed at edge device 110. Encoder 114 may be, for example, a tensor auto-encoder (TAE) to be described later. Encoder 114 may encode input 112 to obtain feature 130. Feature 130 may also be referred to as an "encoded feature." Input 112 may be 2D information (e.g., a 2D image) or 3D information (e.g., a 3D image). Feature 130 may be a latent feature, such as a latent vector.

In some embodiments, in example environment 100, decoder 122 is deployed at cloud 120. Decoder 122 may decode feature 130 of the input. Interpolation (as shown by token 124) may be performed during decoding. Then, decoder 122 performs rendering to obtain 3D scene 126.

In some embodiments, feature 130 is also sent to other edge devices in example environment 100. For example, feature 130 is also sent to edge device 140. Decoder 142 may be deployed in edge device 140, and decoder 142 may also perform interpolation (as shown by token 144). Then, feature 130 may also be decoded at edge device 140 (including interpolation (as shown by token 144)) and rendered to obtain 3D scene 146. In some embodiments, decoder 142 may be the same as decoder 122. In this case, given that the input to decoder 142 in edge device 140 is the same as the input to decoder 122 in cloud 120 (both being feature 130), 3D scene 146 obtained by rendering may be the same as 3D scene 126 obtained by rendering with decoder 122 in cloud 120.

In some embodiments, in example environment 100, an encoder may also be deployed at edge device 140, e.g., an encoder that is the same as encoder 114 at edge device 110. In this way, information input to the encoder can be encoded at edge device 140 to obtain an encoded feature. Then, the encoded feature, similar to feature 130, may be input to cloud 120, decoded at cloud 120 (possibly further including interpolation), and then rendered so as to obtain, e.g., a 3D scene. In some embodiments, the encoded feature, similar to feature 130, may also be input to other edge devices, decoded at other edge devices (possibly further including interpolation) and then rendered so as to obtain, e.g., a 3D scene.

In some embodiments, in example environment 100, a decoder may also be deployed at edge device 110, such as a decoder that is the same as decoder 122 at cloud 120. In this way, at edge device 110, features sent from other edge devices to edge device 110 can be decoded and rendered to obtain scene representations.

In some embodiments, in example environment 100, other edge devices may also send other features to cloud 120 to facilitate decoding and rendering at cloud 120. Although only two edge devices are shown in FIG. 1 (edge device 110 and edge device 140 respectively), it is also possible to include only one edge device or include more than two edge devices in example environment 100. The present disclosure is not limited in this regard.

Figure 2:
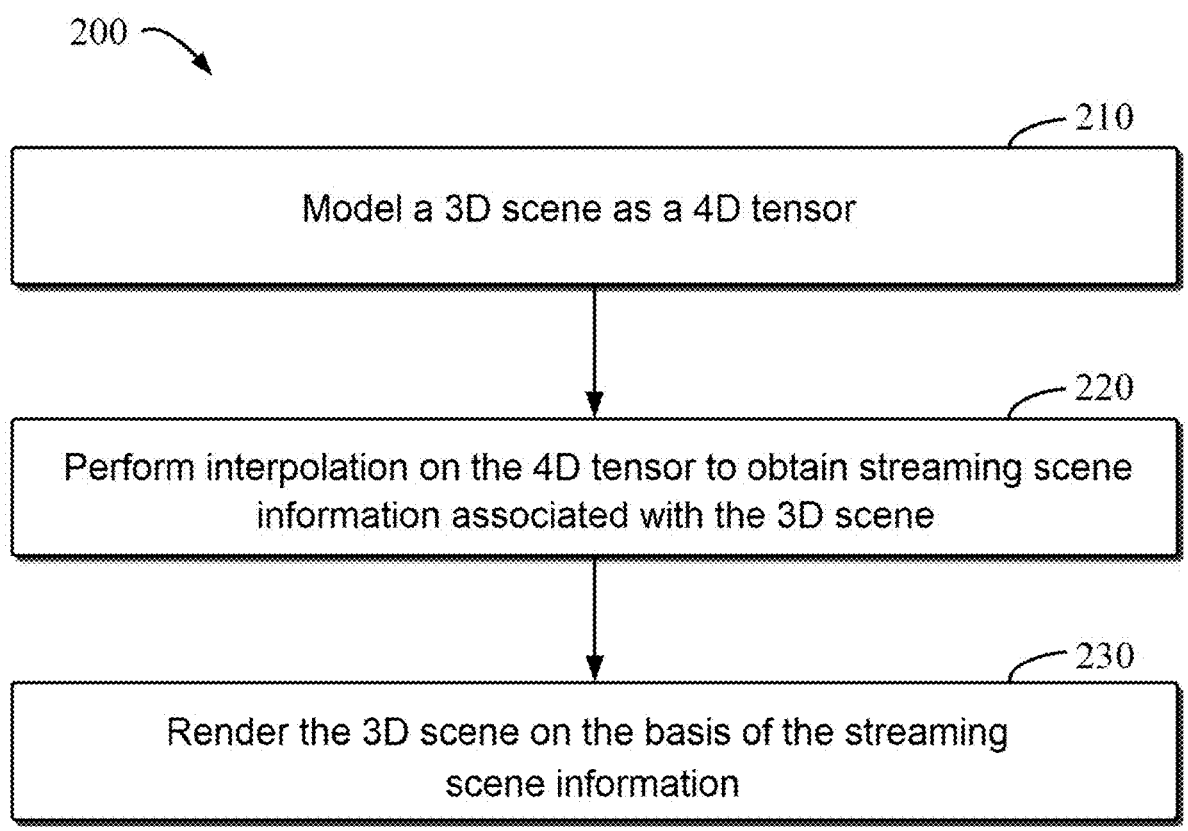
FIG. 2 shows a flowchart of a method for rendering according to an embodiment of the present disclosure.

FIG. 2 shows a flowchart of example method 200 for rendering according to an embodiment of the present disclosure. Example method 200 will be described with reference to FIG. 1.

Example method 200 is performed, for example, by decoder 122 at cloud 120. As shown in FIG. 2, in 210, decoder 122 models the 3D scene as a 4D tensor. A first dimension, a second dimension, and a third dimension in the 4D tensor correspond to an X-Y-Z coordinate axis in the 3D scene, and a fourth dimension represents a channel dimension corresponding to an encoded feature (e.g., feature 130 as shown in FIG. 1). The encoded feature is obtained by encoding the 3D scene (e.g., the 3D scene serves as input 112 as shown in FIG. 1) with an encoder (e.g., encoder 114 as shown in FIG. 1) corresponding to decoder 122.

In some embodiments, in order to model the 3D scene as the 4D tensor, decoder 122 may decompose the 3D scene along the X-Y-Z coordinate axis to obtain vector factors, and then the vector factors are used to model the 3D scene as the 4D tensor. In some embodiments, the product of the vector factors may represent volume information and texture information of the 3D scene. In some embodiments, in order to perform interpolation on the 4D tensor, for position coordinates in the 3D scene, decoder 122 may use linear sampling values of the vector factors to determine a corresponding interpolation value.

In some embodiments, decoder 122 may use a Bayesian tensor interpolation method to perform interpolation on the 4D tensor. Specifically, decoder 122 may use a Bayesian tensor interpolation method to determine distribution of missing data in the encoded feature, and then add the missing data in the fourth dimension of the 4D tensor by interpolation.

Returning to FIG. 2, in 220, decoder 122 performs interpolation on the 4D tensor to obtain streaming scene information associated with the 3D scene. Then, in 230, decoder 122 renders the 3D scene on the basis of the streaming scene information so as to reconstruct the 3D scene at cloud 120.

In some embodiments, during rendering the 3D scene on the basis of the streaming scene information, decoder 122 may generate a 3D scene representation corresponding to the 3D scene on the basis of the streaming scene information and then render the 3D scene on the basis of the 3D scene representation.

In some embodiments, the encoder and the decoder are used for edge-cloud 3D collaboration, the encoder is deployed at one of the edge devices, and the decoder is deployed at at least one of the other edge devices and the cloud. For example, in the embodiment as shown in FIG. 1, encoder 114 is deployed at edge device 110, and decoder 122 is deployed at cloud 120. Decoder 122 may also be deployed at edge device 140. Decoder 122 may also be deployed at edge device 110 in the case where edge device 110 needs to decode encoded features from other edge devices.

In some embodiments, decoder 122 may also decompose the 4D tensor into a plurality of tensor elements. The tensor elements in the plurality of tensor elements may represent a compact low-rank component. The tensor elements may be a sum of scalar products.

In this way, according to example method 200, a unified and flexible architecture can be provided for edge-cloud 3D collaboration (e.g., 3D rendering collaboration between edge device 110 and cloud 120 as shown in FIG. 1), 3D scene rendering can be processed effectively and efficiently, and compact and robust data transmission can be achieved, thereby benefiting downstream applications.

Given an image of a scene, the 3D scene representation should be able to preserve the texture information of the object and preserve the volume information of the object. This will be illustrated below with reference to FIG. 3.

Figure 3:
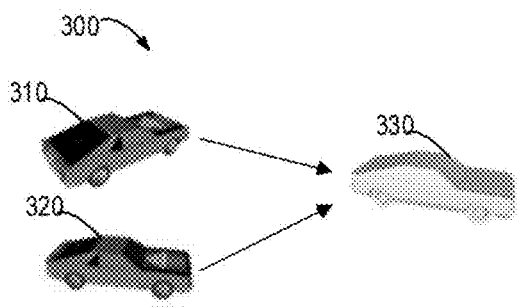
FIG. 3 shows a schematic diagram of a 3D scene/object representation for rendering according to an embodiment of the present disclosure.

FIG. 3 shows schematic diagram 300 for rendering according to an embodiment of the present disclosure. FIG. 3 will be described with reference to FIG. 1 and FIG. 2. FIG. 3 schematically shows that corresponding 3D scene/object representation 330 is obtained from two images (shown as 310 and 320, respectively), e.g., by a tensor auto-encoder (e.g., encoder 114 as shown in FIG. 1) and a tensor decoder (e.g., decoder 122 as shown in FIG. 1). Images 310 and 320 corresponds to input 112 as shown in FIG. 1 and are two images representing the same scene object. Images 310 and 320 may be 2D images or 3D images, respectively, or one of them may be a 3D image and the other one may be a 2D image.

Figure 4:
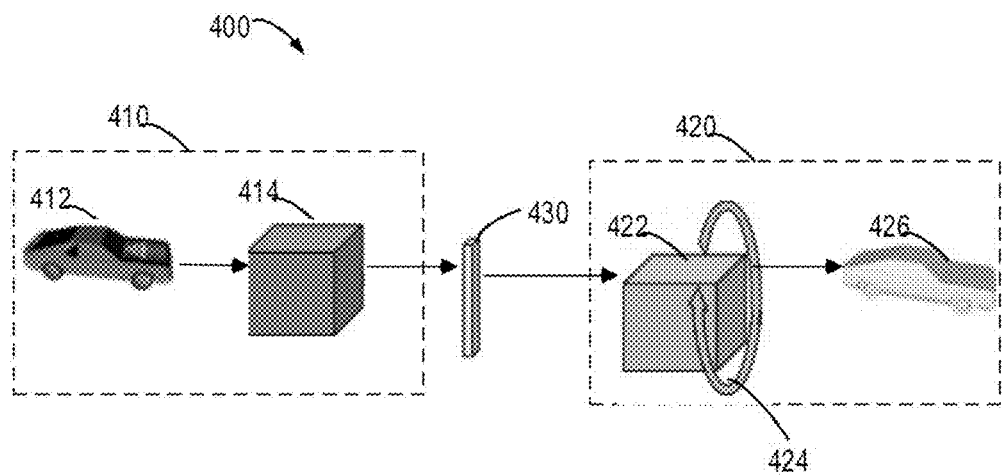
FIG. 4 shows a schematic diagram of a data processing procedure for rendering according to an embodiment of the present disclosure.

FIG. 4 shows a schematic diagram of data processing procedure 400 for rendering according to an embodiment of the present disclosure. FIG. 4 will be illustrated with reference to FIG. 1.

Data processing procedure 400 involves edge device 410 (corresponding to edge device 110 as shown in FIG. 1) and cloud 420 (corresponding to cloud 120 as shown in FIG. 1). As shown in FIG. 4, at edge device 410, 2D image 412 of the object (e.g., input 112 as shown in FIG. 1) is input into tensor auto-encoder 414 (corresponding to encoder 114 as shown in FIG. 1) according to the present disclosure. For example, tensor auto-encoder 414 may be embedded in edge device 410, and specifically, for example, may be embedded in a computer or other electronic device within or comprising edge device 410. With tensor auto-encoder 414, information observed at edge device 410 on the basis of 2D image 412 of the input object can be compressed into latent feature 430 (corresponding to feature 130 as shown in FIG. 1) in a manner of tensor decomposition. Given that the characteristic of tensor decomposition is that a 3D low-rank feature can be guaranteed after decomposition, it means that redundant information is removed. Originally, 10 bits are used to characterize one feature, but 9 bits are redundant, then tensor decomposition will remove those 9 redundant bits, leaving only 1 useful bit, which is known as the low-rank feature. In other words, it is guaranteed that no features are lost (features are preserved) and that the data size is small enough. In this way, features obtained by processing in a tensor decomposition mode have good compactness, which can significantly reduce the amount of data transmitted over a network, thus reducing processing time delay and solving the bottleneck problem in a communication network.

Then, at cloud 420, decoder 422 can use latent feature 430 to represent 3D scene 426 corresponding to 2D image 412 of the object input to tensor auto-encoder 414.

However, in a harsh network communication environment, latent feature 430 may be partially missing. By using the part of latent feature 430 that is successfully transmitted to cloud 420, interpolation may be performed in decoder 422 (as shown by ring 424 with an arrow in the figure). The method of interpolation using the tensor decoder will be described later.

Figure 5A:
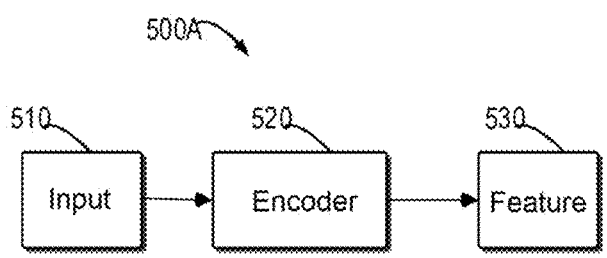
FIG. 5A shows a schematic block diagram of a token generating process for rendering according to an embodiment of the present disclosure.

FIG. 5A shows a schematic block diagram of token generating process 500A for rendering according to an embodiment of the present disclosure. FIG. 5A will be illustrated with reference to FIG. 1.

In token generating process 500A, input 510 (corresponding to input 112 as shown in FIG. 1) is input into encoder 520. Encoder 520 comprises a discrete variational auto-encoder (dVAE) model that is trained to generate images from text descriptions. The dVAE model reconstructs a data sample by learning a compact latent representation of the data. A dVAE may be used to map a given text description to a latent representation, and then the latent representation is used to generate an image corresponding to the text description. Specifically, encoder 520 may include a pre-trained dVAE as a tokenizer (e.g., tokenizer 570 as shown in FIG. 5B), and the tokenizer is used to generate feature 530 (corresponding to feature 130 as shown in FIG. 1).

Figure 5B:
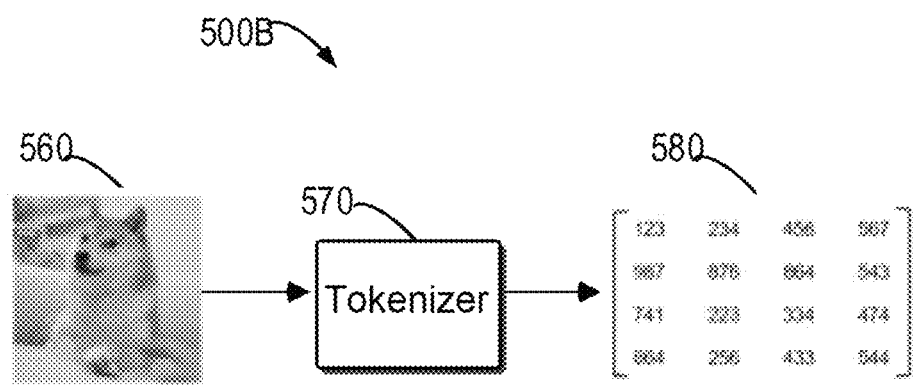
FIG. 5B shows another schematic diagram of a token generating process for rendering according to an embodiment of the present disclosure.

FIG. 5B shows another schematic diagram of token generating process 500B for rendering according to an embodiment of the present disclosure. FIG. 5B will be illustrated with reference to FIGS. 1 and 5A.

In token generation process 500B, 2D image 560 of the scene (e.g., input 112 as shown in FIG. 1) is used as an input. 2D image 560 is input into tokenizer 570. A pre-trained dVAE can be used as tokenizer 570 to generate a series of discrete tokens 580 (corresponding to feature 530 as shown in FIG. 5A).

As shown in FIG. 5B, tokenizer 570 generates a series of discrete tokens 580 on the basis of 2D image 560, and discrete tokens 580 are obtained by encoding compact two-dimensional sequence information of the scene. Tokenizer 570 is pre-trained by auto-encoding-style reconstruction.

Figure 6:
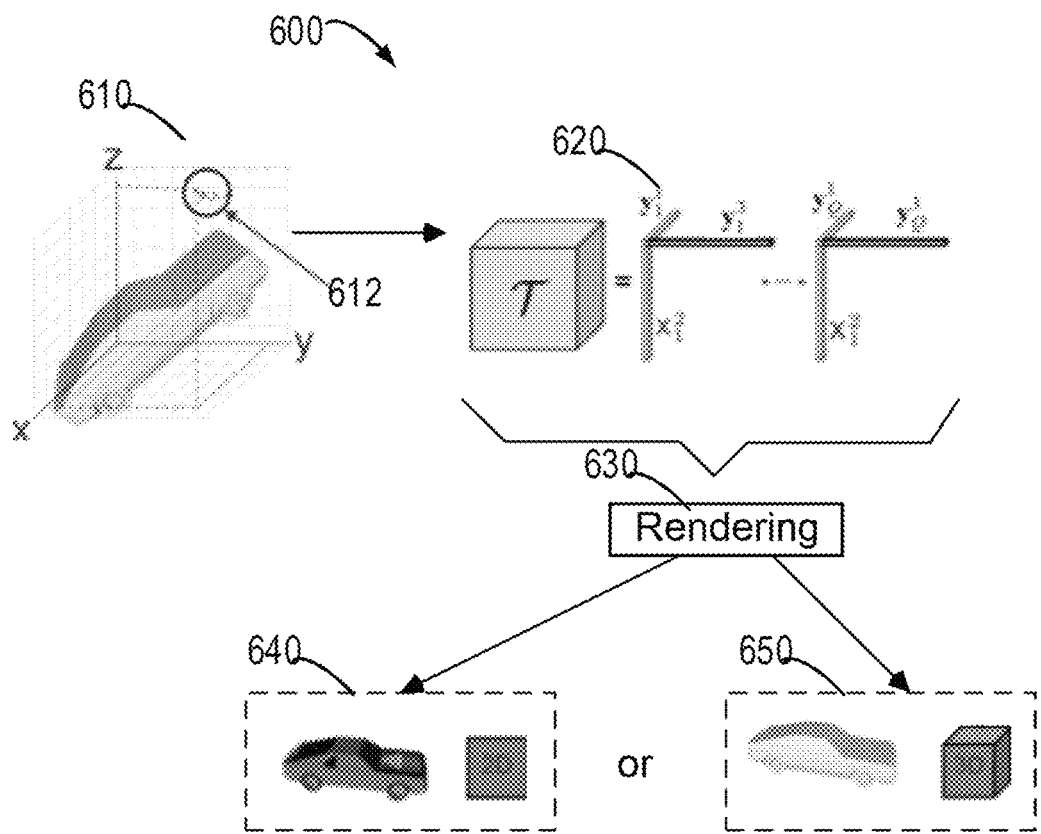
FIG. 6 shows a schematic diagram of a tensor decoder for rendering that may be used to implement embodiments of the present disclosure.

FIG. 6 shows a schematic diagram of tensor decoder 600 for rendering that may be used to implement embodiments of the present disclosure. Tensor decoder 600 represents an example implementation of decoder 122 corresponding to encoder 114 as shown in FIG. 1. FIG. 6 will be illustrated with reference to FIGS. 1, 5A, and 5B.

The 3D scene is modeled as a tensor using a set of decomposition vectors that describe the scene along the corresponding axis. Three of 4D tensor modes correspond to the X-Y-Z axes of grids, and the fourth mode represents the feature channel dimension. These vector factors are used to represent volume information and texture (e.g., RGB) information by the product of the factors. A tensor decoder for the 3D scene representation is as shown in FIG. 4, where the 3D scene can naturally be considered as a 4D tensor. An output from the decoder can be either a 2D RGB image or a 3D grid target.

Note that as the tensor represents discrete data, interpolation may be required to model to obtain a continuous scene representation. For each coordinate position 612, a linear sampling value from the vector factor can be used to efficiently calculate a corresponding trilinear interpolation value.

The entire framework is trained in an unsupervised manner by calculating the loss between a 2D output and an RGB input. Optionally, for certain scene tasks such as model generation, the loss between a 3D output and a 3D grid target can also be calculated.

For example, for ease of illustration, a 3D tensor $T \in R^{I \times J \times K}$ (corresponding to a 4D tensor in the case of a 3D input, the details are similar and will not be repeated) is given for the case of a 2D input, and the 3D tensor T is decomposed into a sum of vector outer products by generalized canonical polyadic (GCP) decomposition, a generalization of CANDECOMP/PARAFAC (CP) decomposition, in accordance with Equation (1) as follows:

$$T = \sum_{r=1}^{R} x_r^1 \circ \left( \sum_{q=1}^{Q} y_q^2 \circ y_q^3 \right) + \sum_{r=1}^{R} x_r^2 \circ \left( \sum_{q=1}^{Q} y_q^1 \circ y_q^3 \right) + \sum_{r=1}^{R} x_r^3 \circ \left( \sum_{q=1}^{Q} y_q^1 \circ y_q^2 \right) \quad (1)$$

where $x_r^1 \in R^I$, $x_r^2 \in R^J$ and $x_r^3 \in R^K$ are decomposition vectors in three modes of an r-th component. The superscript indicates the mode of each factor; ∘ indicates the outer product; R and Q are ranks of the tensor; and $y_q^1 \circ y_2^q$, q=1, 2, . . . , Q corresponds to a rank-one tensor component of a dimension 1 and a dimension 2. Thus, each tensor element $T_{ijk}$ is a sum of scalar products. The tensor is decomposed into a plurality of vectors by GCP decomposition, representing a plurality of compact rank-one components.

With the example tensor decomposing model in Equation (1), Bayesian tensor interpolation (BTI) can be expressed as:

$$P(z|T) = \mathcal{N}\left(z \mid \{x^i\}_{i=1,2,3}, \{y^j\}_{j=1,2,3}, \tau\right) \quad (2)$$

where z indicates the transmitted latent feature, $\mathcal{N}(\cdot)$ indicates Gaussian distribution, and τ indicates precision, which is a common parameter for all elements. Missing data in the latent feature z can be inferred using the conditional probability distribution in Equation (2).

As shown in FIG. 6, the tensor decoder 600 processes input 610 comprising points 612 in a 3D coordinate system to produce a 3D tensor in tensor space 620, from which rendering 630 can produce as outputs a 2D RGB image 640 or a 3D mesh target 650.

In this way, tensor decoder 600 is able to bring about a number of beneficial technical effects. For example, in the task of modeling and reconstructing the 3D scene, a direct X-Y-Z representation of the mode is not only intuitive, but also can preserve the volume information. It is also possible to decompose a scene tensor into a plurality of low-rank factors, thereby obtaining an accurate and compact representation, and achieving a low-rank scene representation. As the 4D tensor of natural sensations/objects is known to be at a low rank, a visually realistic scene representation can be obtained in this mode, which can enhance the visual experience. In addition, through tensor decomposition, the 4D tensor can be used to compactly encode features that change in space. Thus, tensor decoder 600 according to the present disclosure can achieve interpolation of missing data, and can be used to predict the missing data in the latent feature.

Figure 7:
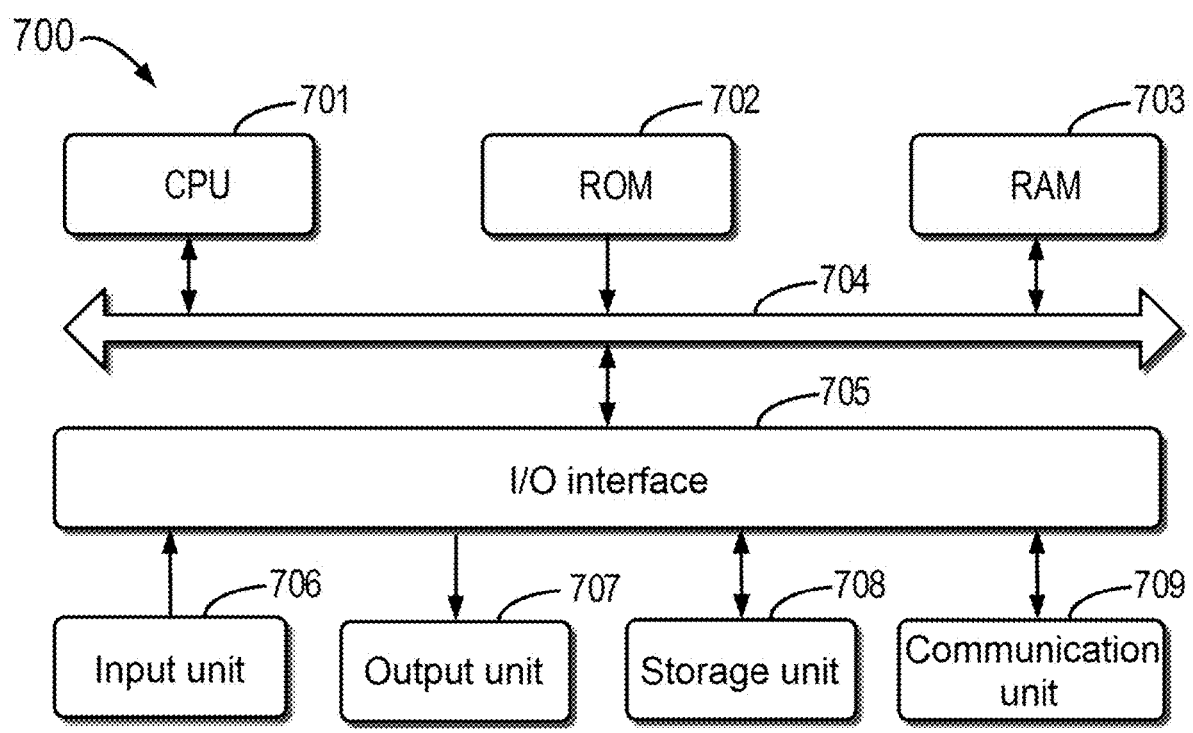
FIG. 7 shows a schematic block diagram of a device that may be used to implement embodiments of the present disclosure.

FIG. 7 shows a schematic block diagram of device 700 that can be used to implement embodiments of the present disclosure. Device 700 may be a device or an apparatus described in embodiments of the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 into random access memory (RAM) 703. Various programs and data required for the operation of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by CPU 701. For example, in some embodiments, one or more of the methods or processes may be implemented as a computer software program that is tangibly included in a machine-readable medium, such as storage unit 708. In some embodiments, part or all of computer programs may be loaded in and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instruction described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives the computer-readable program instruction from a network and forwards the computer-readable program instruction for storage in the computer-readable storage medium in each computing/processing device.

The computer program instruction for performing the operations of the present disclosure may be an assembly instruction, an instruction set architecture (ISA) instruction, a machine instruction, a machine-related instruction, microcode, a firmware instruction, status setting data, or source code or object code written in any combination of one or more programming languages, the programming language including an object-oriented programming language as well as a conventional procedural programming language. The computer-readable program instruction may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instruction. The electronic circuit may execute the computer-readable program instruction so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instruction may also be stored in the computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instruction can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for rendering, comprising:
modeling a three-dimensional (3D) scene as a four-dimensional (4D) tensor, a first dimension, a second dimension, and a third dimension in the 4D tensor corresponding to an X-Y-Z coordinate axis in the 3D scene, a fourth dimension representing a channel dimension corresponding to an encoded feature, and the encoded feature being obtained by encoding the 3D scene with an encoder corresponding to a decoder;
performing interpolation on the 4D tensor to obtain streaming scene information associated with the 3D scene; and
rendering the 3D scene on the basis of the streaming scene information;
wherein the encoder comprises a discrete variational auto-encoder configured to operate as a tokenizer, where the discrete variational auto-encoder receives respective input two-dimensional (2D) images of the 3D scene, and generates from the input 2D images respective ones of a plurality of series of discrete tokens representing respective portions of the encoded feature;
wherein the decoder processes the plurality of series of discrete tokens representing respective portions of the encoded feature to generate one or more output 2D images of the 3D scene; and
wherein the encoder and decoder are trained based at least in part on a loss computed between one or more of the input 2D images and respective corresponding ones of the output 2D images.

2. The method according to claim 1, wherein the encoded feature comprises a latent vector.

3. The method according to claim 1, wherein modeling the 3D scene as the 4D tensor comprises:
decomposing the 3D scene along the X-Y-Z coordinate axis to obtain vector factors; and
using the vector factors to model the 3D scene as the 4D tensor.

4. The method according to claim 3, wherein a product of the vector factors represents volume information and texture information of the 3D scene.

5. The method according to claim 3, wherein performing interpolation on the 4D tensor comprises:
for position coordinates in the 3D scene, using linear sampling values of the vector factors to determine a corresponding interpolation value.

6. The method according to claim 1, further comprising:
decomposing the 4D tensor into a plurality of tensor elements, the tensor elements in the plurality of tensor elements representing a compact low-rank component.

7. The method according to claim 6, wherein at least one of the tensor elements comprises a sum of scalar products.

8. The method according to claim 1, wherein performing interpolation on the 4D tensor comprises:
using a Bayesian tensor interpolation method to perform interpolation on the 4D tensor.

9. The method according to claim 8, wherein using a Bayesian tensor interpolation method to perform interpolation on the 4D tensor comprises:
using a Bayesian tensor interpolation method to determine distribution of missing data in the encoded feature; and
adding the missing data in the fourth dimension of the 4D tensor by interpolation.

10. The method according to claim 1, wherein rendering the 3D scene on the basis of the streaming scene information comprises:
generating a 3D scene representation corresponding to the 3D scene on the basis of the streaming scene information; and
rendering the 3D scene on the basis of the 3D scene representation.

11. The method according to claim 1, wherein
the encoder and the decoder are used for edge-cloud 3D collaboration, the encoder is deployed at an edge device, and the decoder is deployed at at least one of an edge device and a cloud.

12. An electronic device, comprising:
at least one processing unit; and
memory coupled to the at least one processing unit and storing instructions, wherein the instructions, when executed by the at least one processing unit, cause the electronic device to perform actions comprising:
modeling a three-dimensional (3D) scene as a four-dimensional (4D) tensor, a first dimension, a second dimension, and a third dimension in the 4D tensor corresponding to an X-Y-Z coordinate axis in the 3D scene, a fourth dimension representing a channel dimension corresponding to an encoded feature, and the encoded feature being obtained by encoding the 3D scene with an encoder corresponding to a decoder;
performing interpolation on the 4D tensor to obtain streaming scene information associated with the 3D scene; and
rendering the 3D scene on the basis of the streaming scene information;
wherein the encoder comprises a discrete variational auto-encoder configured to operate as a tokenizer, where the discrete variational auto-encoder receives respective input two-dimensional (2D) images of the 3D scene, and generates from the input 2D images respective ones of a plurality of series of discrete tokens representing respective portions of the encoded feature;
wherein the decoder processes the plurality of series of discrete tokens representing respective portions of the encoded feature to generate one or more output 2D images of the 3D scene; and
wherein the encoder and decoder are trained based at least in part on a loss computed between one or more of the input 2D images and respective corresponding ones of the output 2D images.

13. The electronic device according to claim 12, wherein the encoded feature comprises a latent vector.

14. The electronic device according to claim 12, wherein modeling the 3D scene as the 4D tensor comprises:
decomposing the 3D scene along the X-Y-Z coordinate axis to obtain vector factors; and
using the vector factors to model the 3D scene as the 4D tensor.

15. The electronic device according to claim 14, wherein a product of the vector factors represents volume information and texture information of the 3D scene.

16. The electronic device according to claim 14, wherein performing interpolation on the 4D tensor comprises:
for position coordinates in the 3D scene, using linear sampling values of the vector factors to determine a corresponding interpolation value.

17. The electronic device according to claim 12, wherein the actions further comprise:
  decomposing the 4D tensor into a plurality of tensor elements, the tensor elements in the plurality of tensor elements representing a compact low-rank component.

18. The electronic device according to claim 17, wherein at least one of the tensor elements comprises a sum of scalar products.

19. The electronic device according to claim 12, wherein performing interpolation on the 4D tensor comprises:
  using a Bayesian tensor interpolation method to perform interpolation on the 4D tensor.

20. A computer program product, the computer program product being tangibly stored on a non-transitory computer-readable medium and comprising computer-executable instructions, the computer-executable instructions, when executed by a computer, causing the computer to perform operations comprising:
  modeling a three-dimensional (3D) scene as a four-dimensional (4D) tensor, a first dimension, a second dimension, and a third dimension in the 4D tensor corresponding to an X-Y-Z coordinate axis in the 3D scene, a fourth dimension representing a channel dimension corresponding to an encoded feature, and the encoded feature being obtained by encoding the 3D scene with an encoder corresponding to a decoder;
  performing interpolation on the 4D tensor to obtain streaming scene information associated with the 3D scene; and
  rendering the 3D scene on the basis of the streaming scene information;
  wherein the encoder comprises a discrete variational auto-encoder configured to operate as a tokenizer, where the discrete variational auto-encoder receives respective input two-dimensional (2D) images of the 3D scene, and generates from the input 2D images respective ones of a plurality of series of discrete tokens representing respective portions of the encoded feature;
  wherein the decoder processes the plurality of series of discrete tokens representing respective portions of the encoded feature to generate one or more output 2D images of the 3D scene; and
  wherein the encoder and decoder are trained based at least in part on a loss computed between one or more of the input 2D images and respective corresponding ones of the output 2D images.

* * * * *